(12) United States Patent
Zakaria et al.

(10) Patent No.: US 9,717,012 B2
(45) Date of Patent: Jul. 25, 2017

(54) INTERNET OF THINGS (IOT) AUTOMOTIVE DEVICE, SYSTEM, AND METHOD

(71) Applicant: AFERO, INC., Los Altos, CA (US)

(72) Inventors: Omar Zakaria, Santa Clara, CA (US); Joe Britt, Los Altos, CA (US); Houman Forood, San Francisco, CA (US)

(73) Assignee: AFERO, INC., Los Altos, CA (US)

( * ) Notice: Subject to any disclaimer, the term of this patent is extended or adjusted under 35 U.S.C. 154(b) by 0 days.

(21) Appl. No.: 14/727,811

(22) Filed: Jun. 1, 2015

(65) Prior Publication Data

US 2016/0353305 A1    Dec. 1, 2016

(51) Int. Cl.
| | |
|---|---|
| *H04L 12/26* | (2006.01) |
| *H04W 24/10* | (2009.01) |
| *H04W 68/10* | (2009.01) |
| *H04W 4/00* | (2009.01) |
| *H04B 17/318* | (2015.01) |
| *H04M 1/725* | (2006.01) |

(52) U.S. Cl.
CPC .......... *H04W 24/10* (2013.01); *H04B 17/318* (2015.01); *H04M 1/72519* (2013.01); *H04W 4/008* (2013.01); *H04W 68/10* (2013.01)

(58) Field of Classification Search
CPC ... H04W 24/10; H04W 68/00; H04W 68/005; H04W 4/008; H04M 1/72519; H04M 1/72522; H04M 1/72533; H04B 17/318
See application file for complete search history.

(56) References Cited

U.S. PATENT DOCUMENTS

| | | | |
|---|---|---|---|
| 4,654,793 | A | 3/1987 | Elrod |
| 5,574,750 | A | 11/1996 | Peponides et al. |
| 6,199,161 | B1 | 3/2001 | Ahvenainen |
| 7,142,674 | B2 | 11/2006 | Brickell |
| 7,146,613 | B2 | 12/2006 | Chauvel et al. |

(Continued)

FOREIGN PATENT DOCUMENTS

| | | |
|---|---|---|
| CN | 1054693 A | 9/1991 |
| EP | 2806356 A1 | 11/2014 |

(Continued)

OTHER PUBLICATIONS

Final Office Action from U.S. Appl. No. 14/575,463 mailed Aug. 30, 2016, 25 pages.

(Continued)

*Primary Examiner* — Kevin Mew
(74) *Attorney, Agent, or Firm* — Nicholson De Vos Webster & Elliott LLP

(57) ABSTRACT

An apparatus and method are described for an automotive internet of things (IoT) system, apparatus, and method. For example, one embodiment of an automotive Internet of Things (IoT) device configured within a car comprises: a wireless communication interface to take signal strength measurements to a mobile device, the signal strength measurements comprising signal strength values; and a signal strength analysis and notification module to analyze the signal strength values from the mobile device to determine when the user has left his or her mobile device at home or at another location and to responsively generate a notification to the user.

25 Claims, 18 Drawing Sheets

(56) References Cited

U.S. PATENT DOCUMENTS

| | | | |
|---|---|---|---|
| 7,165,180 B1 | 1/2007 | Ducharme | |
| 7,234,062 B2 | 6/2007 | Daum et al. | |
| 7,493,661 B2 | 2/2009 | Liu et al. | |
| 7,548,623 B2 | 6/2009 | Manabe | |
| 7,779,136 B2 | 8/2010 | Krishnan | |
| 7,903,822 B1 | 3/2011 | Hair et al. | |
| 8,396,449 B2* | 3/2013 | Hatton | G08G 1/205 455/404.1 |
| 8,477,948 B2 | 7/2013 | Shon et al. | |
| 8,570,168 B2* | 10/2013 | Logan | H04Q 9/00 340/539.32 |
| 8,761,821 B2* | 6/2014 | Tibbitts | H04W 48/04 455/297 |
| 8,903,351 B2* | 12/2014 | Berry | H04M 1/6091 455/404.1 |
| 9,319,223 B2 | 4/2016 | Nix | |
| 9,338,638 B1 | 5/2016 | Palin et al. | |
| 9,378,634 B1* | 6/2016 | Kashyap | G08B 13/2491 |
| 2002/0013784 A1 | 1/2002 | Swanson | |
| 2002/0142746 A1 | 10/2002 | Li et al. | |
| 2004/0047324 A1 | 3/2004 | Diener | |
| 2004/0203826 A1 | 10/2004 | Sugar et al. | |
| 2006/0018485 A1 | 1/2006 | Diefenderfer et al. | |
| 2006/0135064 A1 | 6/2006 | Cho et al. | |
| 2006/0195883 A1 | 8/2006 | Proctor, Jr. et al. | |
| 2007/0126560 A1* | 6/2007 | Seymour | B60R 25/241 340/426.1 |
| 2007/0150740 A1 | 6/2007 | Davis et al. | |
| 2007/0205876 A1* | 9/2007 | Nguyen | B60R 25/00 340/426.12 |
| 2008/0120701 A1 | 5/2008 | Schiller et al. | |
| 2008/0129545 A1* | 6/2008 | Johnson | G07C 9/00111 340/933 |
| 2008/0180222 A1* | 7/2008 | Hollister | H04L 29/12264 340/10.3 |
| 2008/0200195 A1 | 8/2008 | Abe et al. | |
| 2008/0204555 A1* | 8/2008 | Hughes | B60R 25/102 348/148 |
| 2008/0312946 A1 | 12/2008 | Valentine et al. | |
| 2009/0011739 A1 | 1/2009 | Cofta | |
| 2009/0019423 A1 | 1/2009 | Halter et al. | |
| 2009/0061806 A1 | 3/2009 | Saito et al. | |
| 2009/0082017 A1 | 3/2009 | Chang et al. | |
| 2009/0327996 A1 | 12/2009 | Siegemund et al. | |
| 2010/0075655 A1 | 3/2010 | Howarter et al. | |
| 2010/0115291 A1 | 5/2010 | Buer | |
| 2010/0122083 A1 | 5/2010 | Gim et al. | |
| 2010/0135494 A1 | 6/2010 | Armknecht et al. | |
| 2010/0201482 A1 | 8/2010 | Robertson et al. | |
| 2011/0151768 A1 | 6/2011 | Snider et al. | |
| 2011/0191787 A1 | 8/2011 | Poleg et al. | |
| 2011/0200188 A1 | 8/2011 | Ghouti et al. | |
| 2011/0252235 A1 | 10/2011 | Dolan et al. | |
| 2011/0302078 A1* | 12/2011 | Failing | B60L 3/00 705/39 |
| 2011/0319088 A1* | 12/2011 | Zhou | H04W 52/243 455/442 |
| 2012/0011360 A1 | 1/2012 | Engels et al. | |
| 2012/0036552 A1 | 2/2012 | Dare et al. | |
| 2012/0079045 A1* | 3/2012 | Plotkin | H04L 12/585 709/206 |
| 2012/0108230 A1 | 5/2012 | Stepanian | |
| 2012/0122461 A1 | 5/2012 | Hossain et al. | |
| 2012/0142271 A1 | 6/2012 | Zhodzishsky et al. | |
| 2012/0225640 A1 | 9/2012 | Bosch et al. | |
| 2012/0331287 A1 | 12/2012 | Bowman et al. | |
| 2013/0012123 A1 | 1/2013 | Deluca | |
| 2013/0012134 A1 | 1/2013 | Jin et al. | |
| 2013/0042244 A1 | 2/2013 | Li et al. | |
| 2013/0085614 A1 | 4/2013 | Wenzel et al. | |
| 2013/0154819 A1 | 6/2013 | Stefanovski et al. | |
| 2013/0190010 A1* | 7/2013 | Chiou | G01S 5/0252 455/456.1 |
| 2013/0246996 A1 | 9/2013 | Duggal et al. | |
| 2013/0257604 A1 | 10/2013 | Mirle et al. | |
| 2013/0307702 A1 | 11/2013 | Pal et al. | |
| 2013/0342314 A1 | 12/2013 | Chen et al. | |
| 2014/0038526 A1 | 2/2014 | Ennis et al. | |
| 2014/0047322 A1 | 2/2014 | Kim et al. | |
| 2014/0075198 A1 | 3/2014 | Peirce et al. | |
| 2014/0098957 A1 | 4/2014 | Larsson | |
| 2014/0148196 A1 | 5/2014 | Bassan-Eskenazi et al. | |
| 2014/0155031 A1 | 6/2014 | Lee et al. | |
| 2014/0179338 A1 | 6/2014 | Shang et al. | |
| 2014/0244825 A1 | 8/2014 | Cao et al. | |
| 2014/0270166 A1 | 9/2014 | Avanzi et al. | |
| 2014/0279546 A1 | 9/2014 | Poole et al. | |
| 2014/0281547 A1 | 9/2014 | Modzelewski et al. | |
| 2014/0282357 A1 | 9/2014 | Padaliak et al. | |
| 2014/0289366 A1 | 9/2014 | Choi et al. | |
| 2014/0304381 A1 | 10/2014 | Savolainen et al. | |
| 2014/0310515 A1 | 10/2014 | Kim et al. | |
| 2014/0317293 A1 | 10/2014 | Shatzkamer | |
| 2014/0329467 A1 | 11/2014 | Ewing et al. | |
| 2014/0351312 A1 | 11/2014 | Lu et al. | |
| 2014/0351790 A1 | 11/2014 | Ghose et al. | |
| 2015/0006696 A1 | 1/2015 | Hershberg | |
| 2015/0019553 A1 | 1/2015 | Shaashua et al. | |
| 2015/0019714 A1 | 1/2015 | Shaashua et al. | |
| 2015/0029880 A1 | 1/2015 | Burns et al. | |
| 2015/0058802 A1 | 2/2015 | Turaj et al. | |
| 2015/0067329 A1 | 3/2015 | Ben Saied et al. | |
| 2015/0067580 A1 | 3/2015 | Um et al. | |
| 2015/0071139 A1 | 3/2015 | Nix | |
| 2015/0106616 A1 | 4/2015 | Nix | |
| 2015/0113275 A1 | 4/2015 | Kim et al. | |
| 2015/0113592 A1 | 4/2015 | Curtis et al. | |
| 2015/0121470 A1 | 4/2015 | Rongo et al. | |
| 2015/0134761 A1 | 5/2015 | Sharma et al. | |
| 2015/0148989 A1 | 5/2015 | Cooper et al. | |
| 2015/0149042 A1 | 5/2015 | Cooper et al. | |
| 2015/0201022 A1 | 7/2015 | Kim et al. | |
| 2015/0207796 A1 | 7/2015 | Love et al. | |
| 2015/0222517 A1 | 8/2015 | McLaughlin et al. | |
| 2015/0295713 A1 | 10/2015 | Oxford | |
| 2015/0296325 A1 | 10/2015 | Lee et al. | |
| 2015/0319046 A1 | 11/2015 | Plummer et al. | |
| 2015/0324181 A1 | 11/2015 | Segal | |
| 2015/0326398 A1 | 11/2015 | Modarresi et al. | |
| 2015/0358157 A1 | 12/2015 | Zhang et al. | |
| 2015/0365787 A1 | 12/2015 | Farrell | |
| 2016/0006729 A1 | 1/2016 | Yang et al. | |
| 2016/0063767 A1 | 3/2016 | Lee et al. | |
| 2016/0085960 A1 | 3/2016 | Priev et al. | |
| 2016/0112870 A1 | 4/2016 | Pathuri | |
| 2016/0127874 A1 | 5/2016 | Kingsmill et al. | |
| 2016/0149696 A1 | 5/2016 | Winslow et al. | |
| 2016/0150357 A1 | 5/2016 | Jung et al. | |
| 2016/0182228 A1 | 6/2016 | Smith et al. | |
| 2016/0182459 A1 | 6/2016 | Britt et al. | |
| 2016/0182549 A1 | 6/2016 | Bachar et al. | |
| 2016/0292938 A1 | 10/2016 | Zakaria | |
| 2016/0295364 A1 | 10/2016 | Zakaria | |

FOREIGN PATENT DOCUMENTS

| | | |
|---|---|---|
| WO | 2013179634 A1 | 12/2013 |
| WO | 2014131021 A2 | 8/2014 |

OTHER PUBLICATIONS

Galeev, "Bluetooth 4.0: An introduction to Bluetooth Low Energy" (Part I and II), EETimes, accessed on eetimes.com, Jul. 2011, 14 pages.

Hasbro Playskool Alphie toy; all pages; http://www.hasbro.com/common/documents/dad2af771c4311ddbd0b0800200c9a66/6135ABCA1989F3691034808DE78694FF.pdf.

IBM, "The IBM vision of a smarter home enabled by cloud technology", Global Electronics Industry, white paper Sep. 2010, 16 pages.

(56) References Cited

OTHER PUBLICATIONS

International Search Report and the Written Opinion of the International Searching Authority from counterpart PCT Application No. PCT/US2015/061308, mailed Mar. 16, 2016, 16 pages.
International Search Report and the Written Opinion of the International Searching Authority from counterpart PCT Application No. PCT/US2015/065539, mailed Feb. 12, 2016, 19 pages.
International Search Report and Written Opinion for Application No. PCT/US16/25069 mailed Jul. 1, 2016, 11 pages.
International Search Report and Written opinion for Application No. PCT/US2016/040819 mailed Oct. 31, 2016, 12 pages.
Kainda et al., Usability and Security of Out-Of-Band Channels in Secure Device Pairing Protocols, Symposium on Usable Privacy and Security (SOUPS) Jul. 2009, 12 pages.
Non-Final Office Action from U.S. Appl. No. 14/550,667 mailed Dec. 17, 2015, 10 pages.
Non-Final Office Action from U.S. Appl. No. 14/550,775 mailed Sep. 21, 2016, 19 pages.
Non-Final Office Action from U.S. Appl. No. 14/575,463 mailed Mar. 11, 2016, 23 pages.
Non-Final Office Action from U.S. Appl. No. 14/575,535 mailed Aug. 12, 2016, 11 pages.
Non-Final Office Action from U.S. Appl. No. 14/673,551 mailed Oct. 21, 2016, 27 pages.
Non-Final Office Action from U.S. Appl. No. 14/673,582 mailed Nov. 3, 2016, 6 pages.
Non-Final Office Action from U.S. Appl. No. 14/791,371 mailed Nov. 4, 2016, 16 pages.
Non-Final Office Action from U.S. Appl. No. 14/927,732 mailed Aug. 15, 2016, 14 pages.
Non-Final Office Action from U.S. Appl. No. 14/927,732 mailed Dec. 5, 2016, 16 pages.
Notice of Allowance from U.S. Appl. No. 14/550,667 mailed Oct. 7, 2016, 3 pages.
Notice of Allowance from U.S. Appl. No. 14/550,735, mailed Dec. 22, 2016, 11 pages .
Notice of Allowance mailed Jul. 11, 2016 for U.S. Appl. No. 14/550,667, filed Nov. 21, 2014, 9 pages.
Perera et al, Dynamic Configuration of Sensors Using Mobile Sensor Hub in Internet o Things Paradigm, Research School of Computer Science, The Australian National University, arXiv:1302.1131 v1, Feb. 2013, 6 pages.
Restriction Requirement for U.S. Appl. No. 14/575,535 mailed Apr. 11, 2016, 5 pages.
Saxena et al., "Secure Device Pairing based on a Visual Channel", Proceedings of the 2006 IEEE Symposium on Security and Privacy, ISBN: 0769525741, 2006, 7 pages.
Sye Loong Keoh, Securing the Internet of Things: A Standardization Perspective, IEEE Internet of Things Journal, vol. 1, No. 3, Jun. 2014; p. 265-275.
Wikipedia, "Bluetooth low energy" found at en.wikipedia.org/wiki/Biuetooth_low_energy, May 2010, 10 pages.
Final Office Action from U.S. Appl. No. 141673,551, mailed Feb. 23, 2017, 36 pages.
Non-Final Office Action from U.S. Appl. No. 14/791,373, mailed Dec. 30, 2016, 18 pages.
Notice of Allowance from U.S. Appl. No. 14/673,582, mailed Mar. 1, 2017, 28 pages.
Diao Q.,"The Design of Electronic Thermometer Based on Bluetooth Low Energy," IEEE, 2013, pp. 1-5.
International Search Report and Written Opinion for Application No. PCT/US2016/035161 mailed on Aug. 31, 2016, 9 pages.
Abandonment from U.S. Appl. No. 14/575,535, mailed May 18, 2017, 2 pages.
Blackstock et al., "IoT Interoperability: A Hub-based Approach," International Conference on the Internet of Things, 2014, pp. 79-84.
Final Office Action from U.S. Appl. No. 14/550,775, mailed Apr. 6, 2017, 39 pages.
Final Office Action from U.S. Appl. No. 14/927,732, mailed Apr. 27, 2017, 35 pages.
Non-Final Office Action from U.S. Appl. No. 14/799,436, mailed Mar. 24, 2017, 32 pages.
Notice of Allowance from U.S. Appl. No. 14/550,735, mailed Mar. 22, 2017, 32 pages.
Notice of Allowance from U.S. Appl. No. 14/575,463, mailed Apr. 5, 2017, 35 pages.
Notice of Allowance from U.S. Appl. No. 14/791,371, mailed May 30, 2017, 31 pages.
Notice of Allowance from U.S. Appl. No. 14/791,373, mailed Apr. 21, 2017, 19 pages.

\* cited by examiner

INTERNET OF THINGS (IOT) AUTOMOTIVE DEVICE, SYSTEM, AND METHOD

BACKGROUND

Field of the Invention

This invention relates generally to the field of computer systems. More particularly, the invention relates to a system and method for an Internet of Things (IoT) automotive device, system, and method.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

Some vehicles today are equipped with wireless connectivity. For example, General Motors recently announced that certain Chevrolet® vehicles will be equipped with 4G Long Term Evolution (LTE) connectivity. These vehicles may also provide WiFi hotspot connectivity, allowing users with WiFi devices to connect to establish an Internet over the LTE communication channel.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
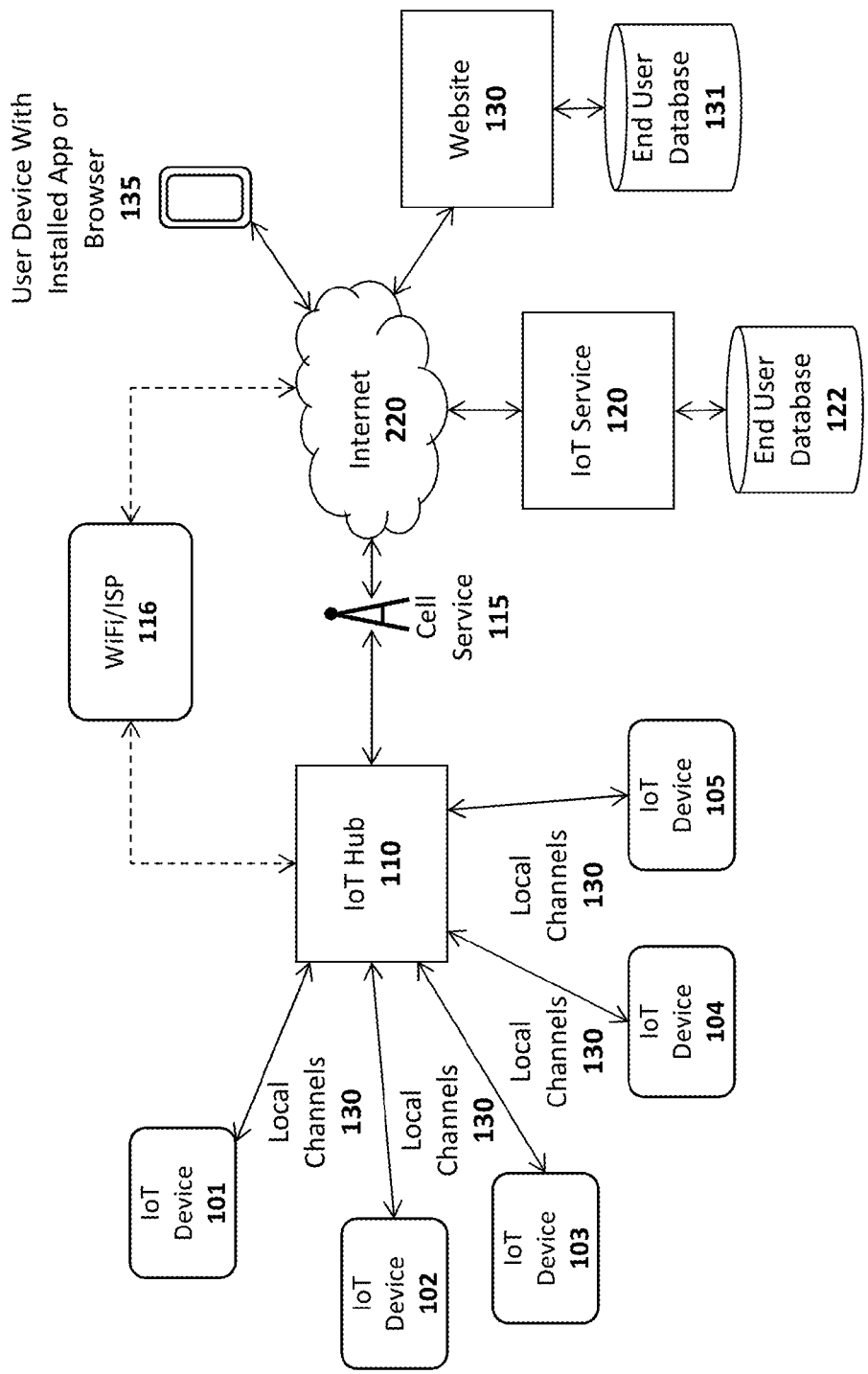
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectors, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
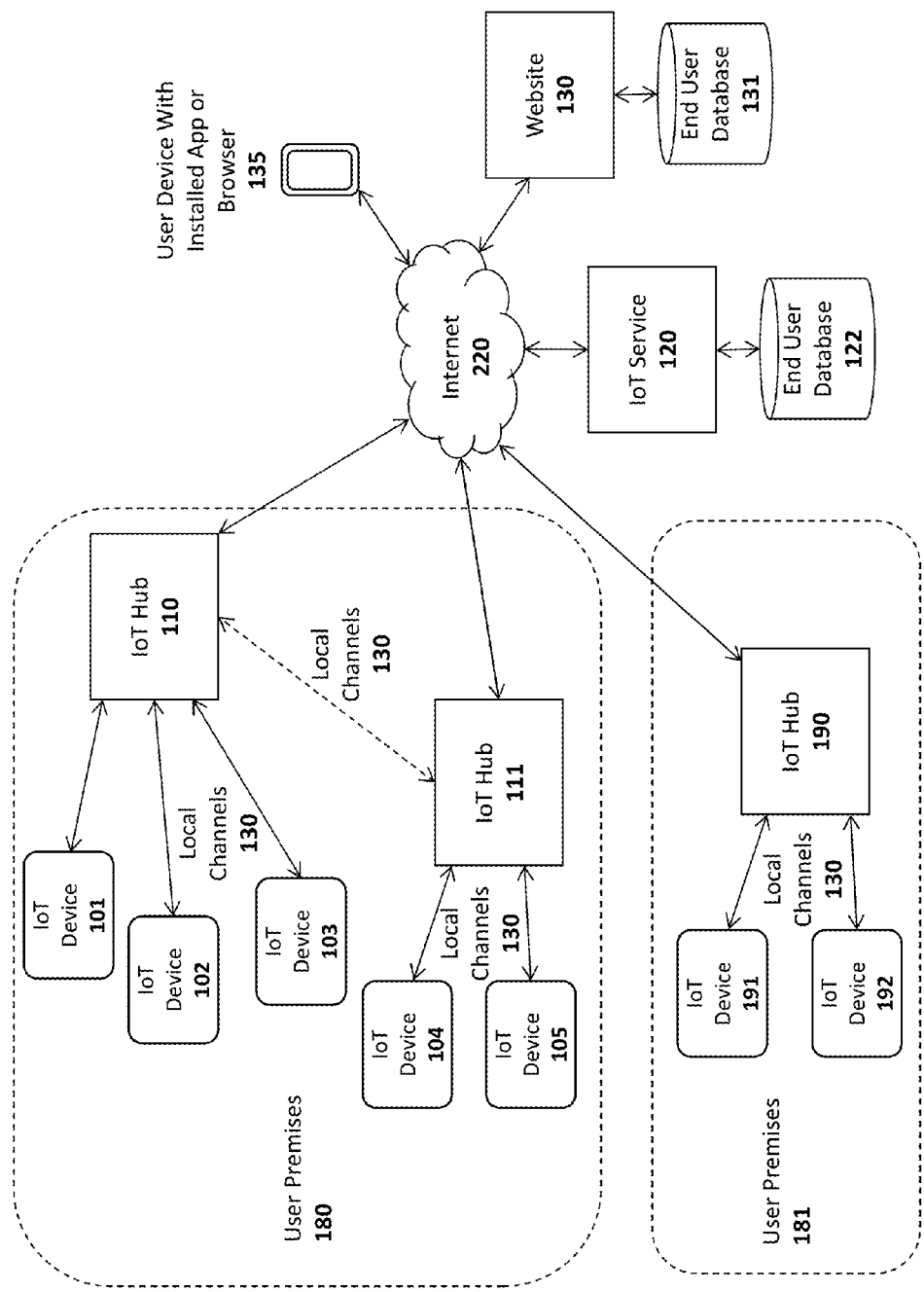

FIG. 1B illustrates additional connection options for a plurality of IoT hubs 110-111, 190. In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
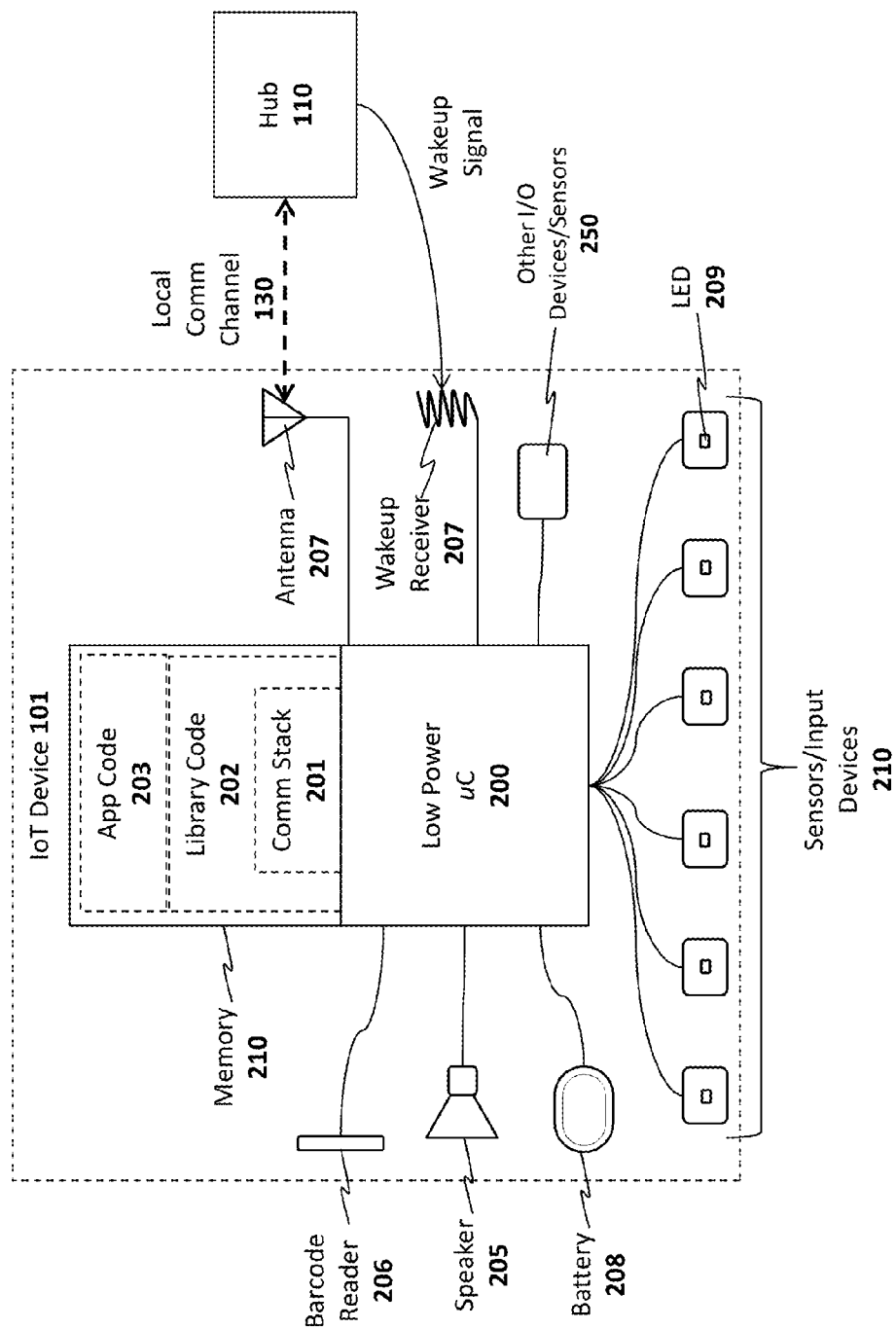
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identify module (SIM).

Figure 3:
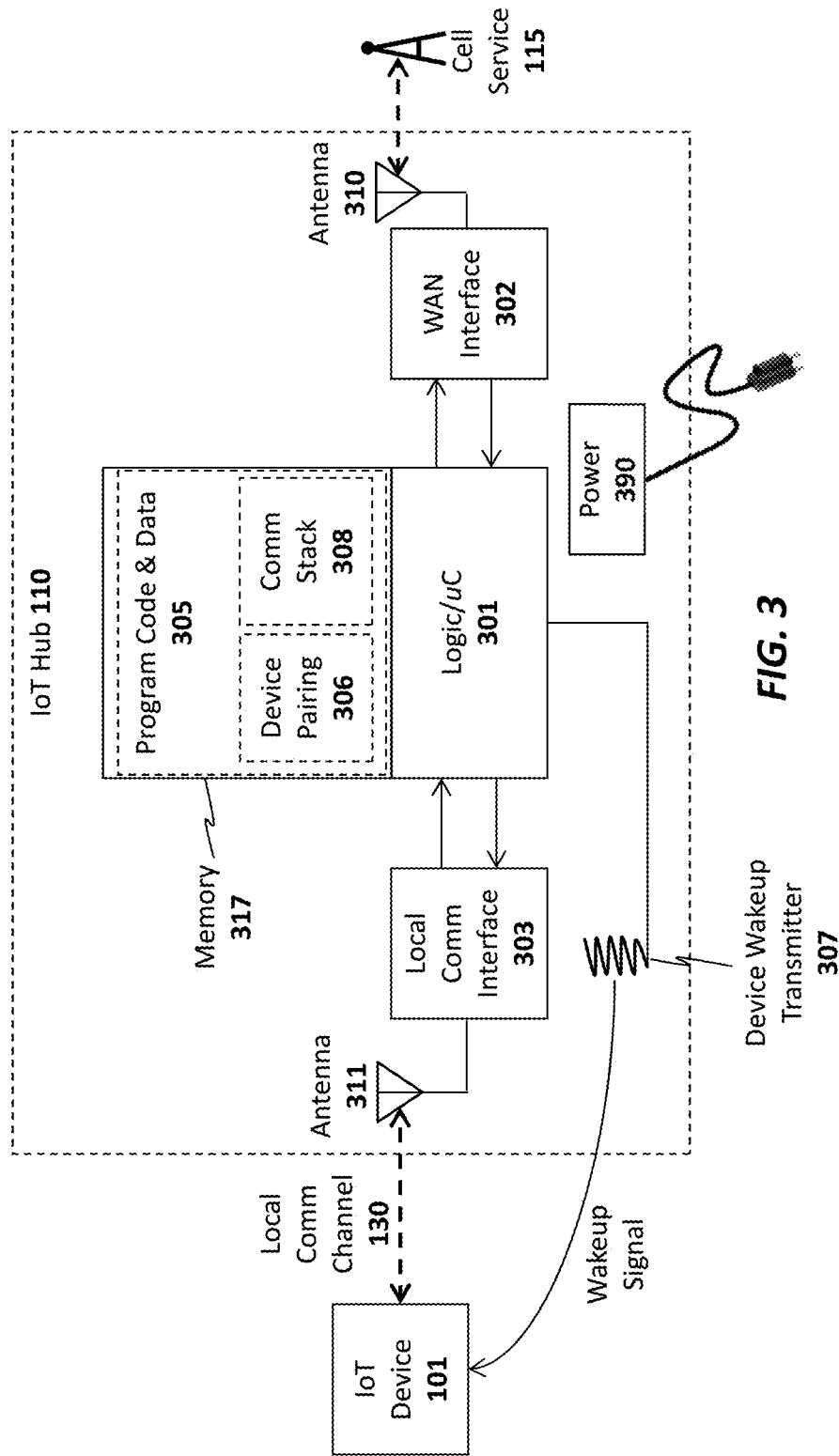
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identify module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
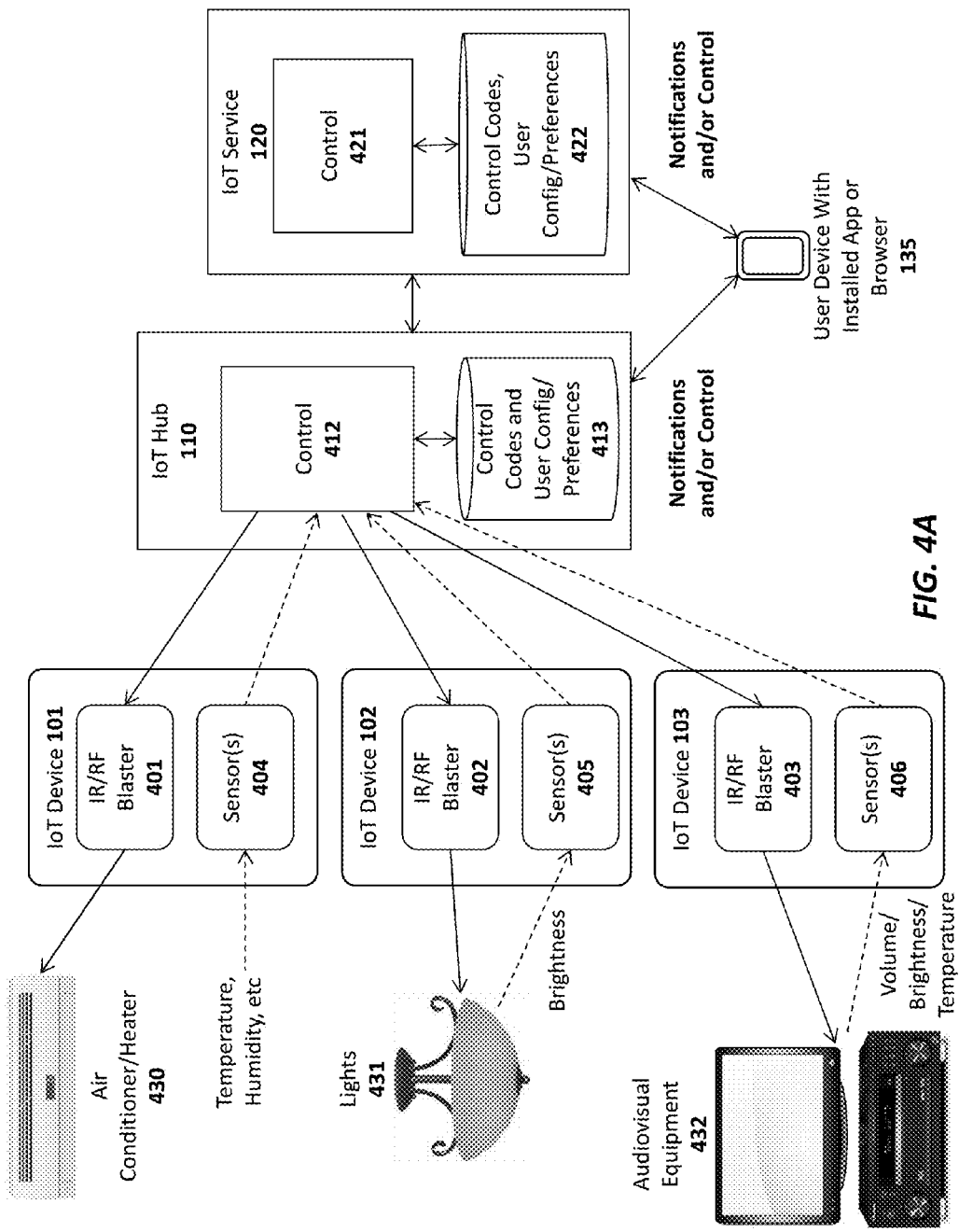
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
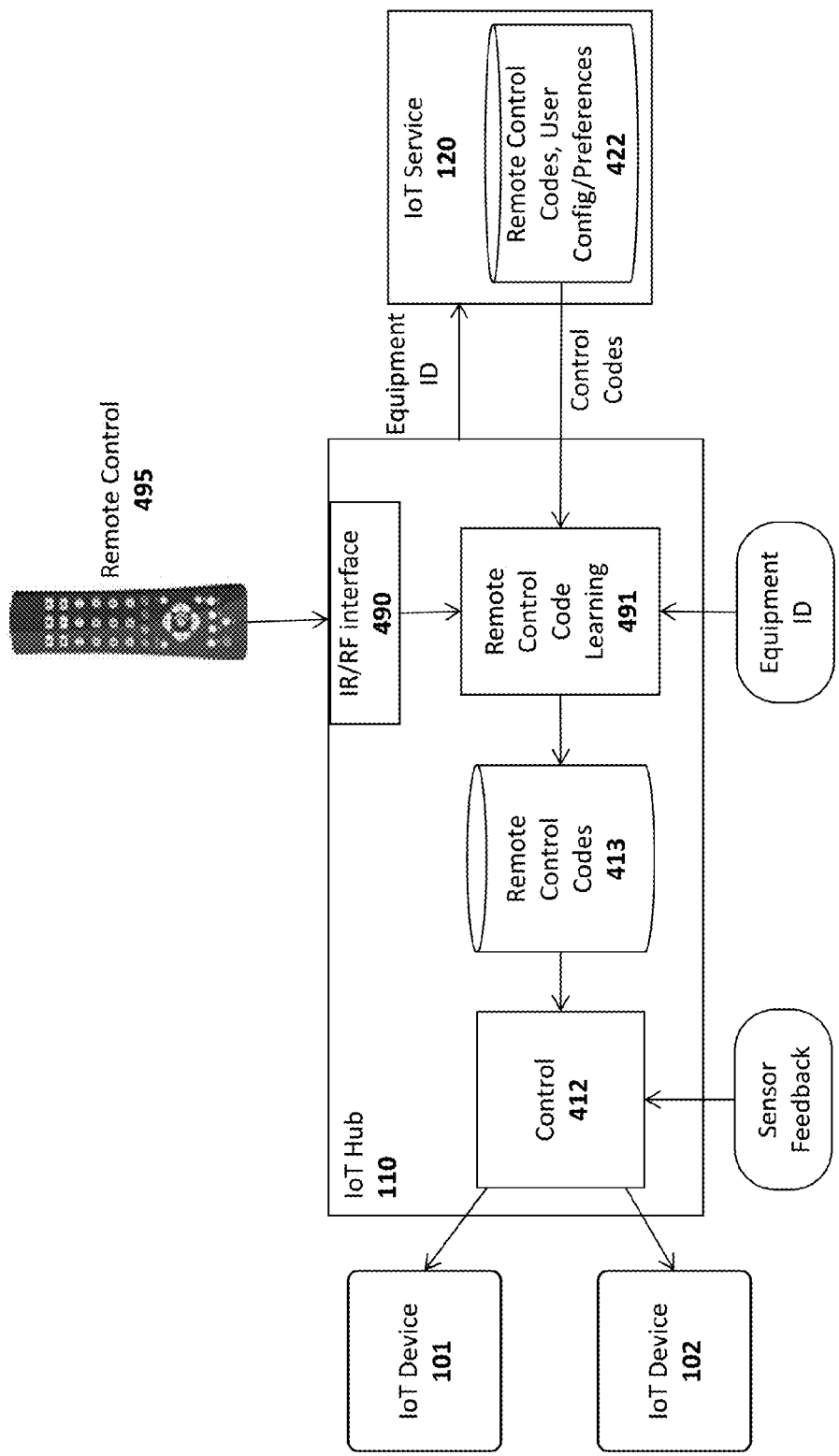

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
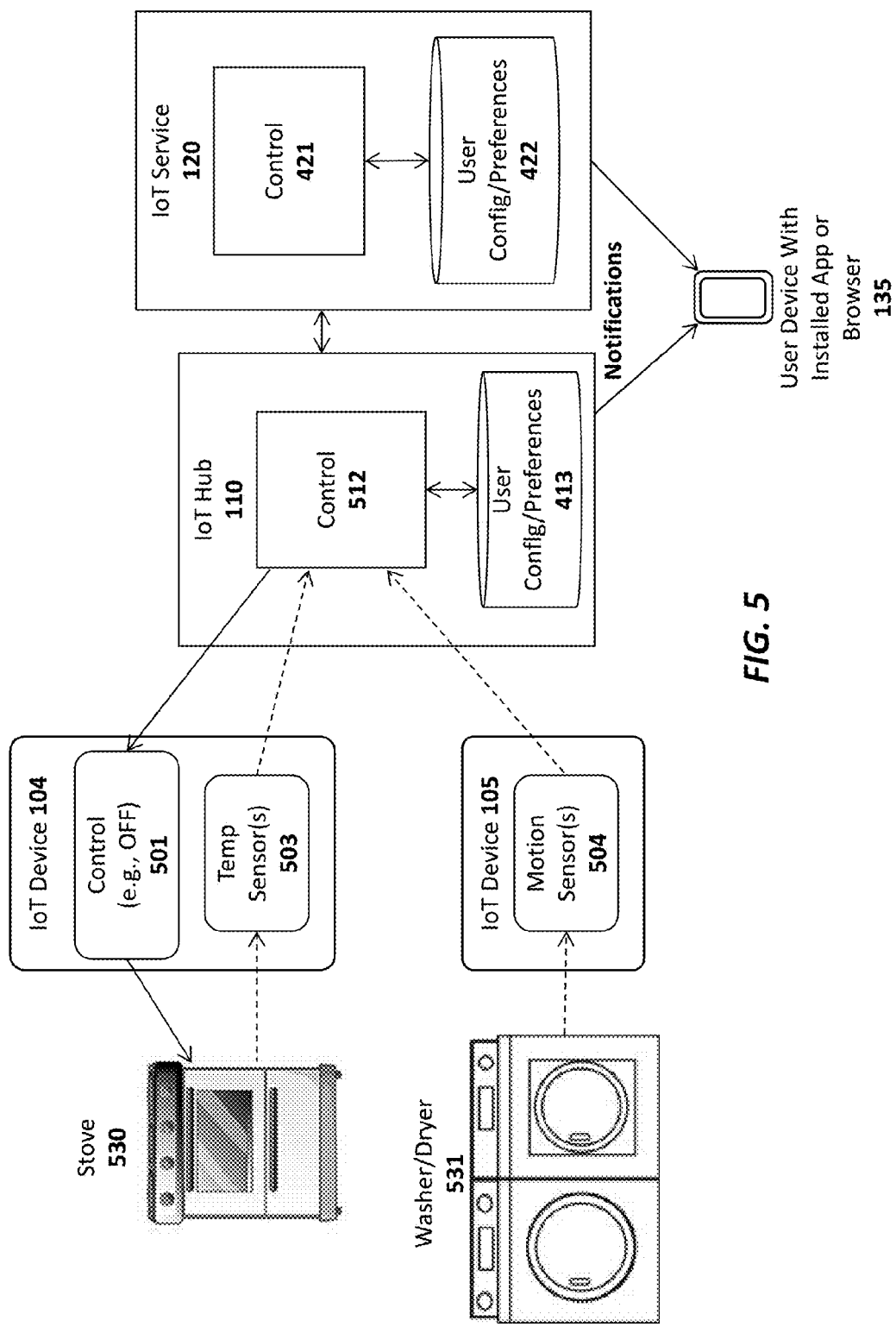
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 6-11 and associated text). Alternatively, the keys may be secured in a subscriber identify module (SIM) as discussed below.

Figure 6:
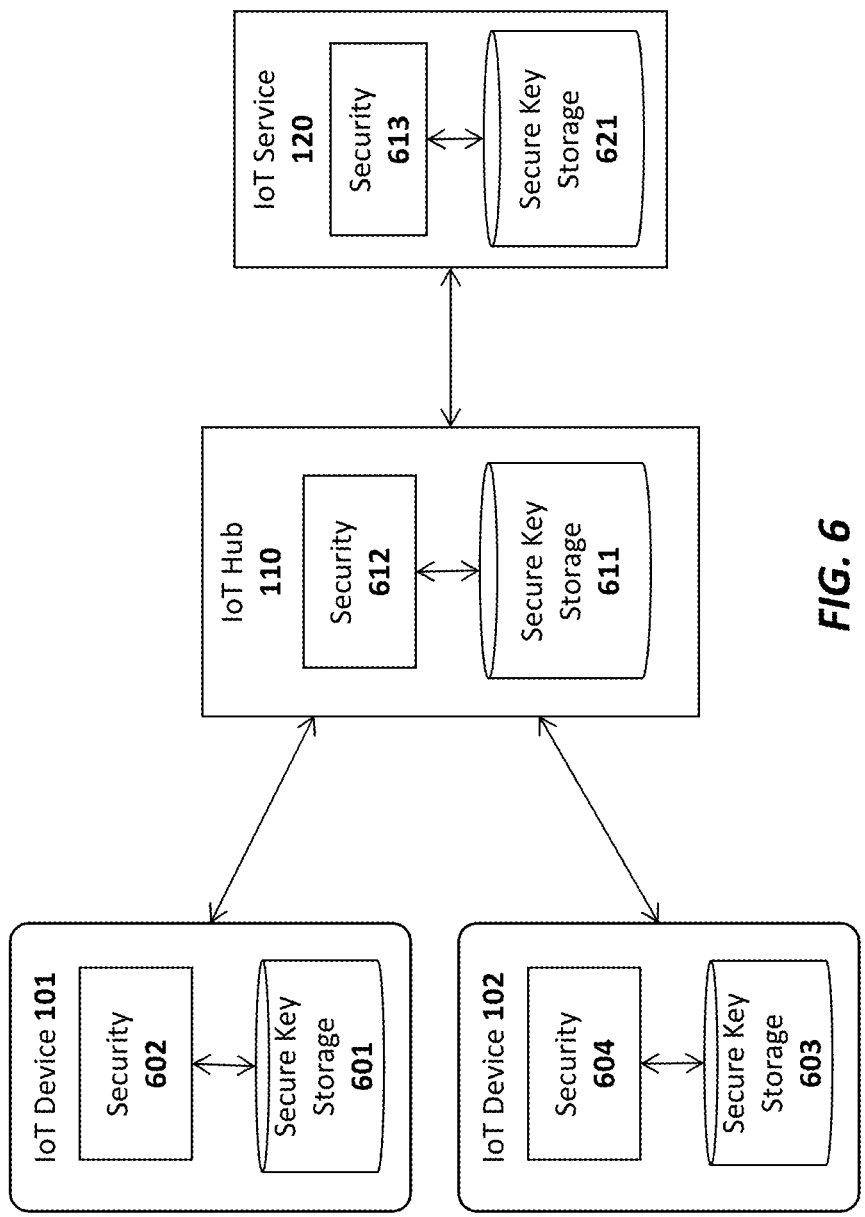
FIG. 6 illustrates embodiments of the invention which implements improved security techniques such as encryption and digital signatures.

FIG. 6 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 601, 603, respectively, for security storing each device's private key. Security logic 602, 604 then utilizes the securely stored private keys to perform the encryption/decryption operations described herein. Similarly, the IoT hub 110 includes a secure storage 611 for storing the IoT hub private key and the public keys of the IoT devices 101-102 and the IoT service 120; as well as security logic 612 for using the keys to perform encryption/decryption operations. Finally, the IoT service 120 may include a secure storage 621 for security storing its own private key, the public keys of various IoT devices and IoT hubs, and a security logic 613 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 611.

By way of example, in one embodiment, when the IoT service 120 needs to transmit a command or data to an IoT device 101 (e.g., a command to unlock a door, a request to read a sensor, data to be processed/displayed by the IoT device, etc) the security logic 613 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 612 in the IoT hub is trusted, the service 120 could negotiate a session key with the hub security module 1312 and then the security module 612 would negotiate a session key with each device 120. Messages from the service 120 would then be decrypted and verified in the hub security module 612 before being re-encrypted for transmission to the device 101.

In one embodiment, to prevent a compromise on the hub security module 612 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 602 on the IoT device 101 uses the public key of the IoT hub 110 to encrypt data packets sent to the IoT hub 110. The security logic 612 on the IoT hub 110 may then decrypt the data packets using the IoT hub's private key. Similarly, the security logic 602 on the IoT device 101 and/or the security logic 612 on the IoT hub 110 may encrypt data packets sent to the IoT service 120 using the public key of the IoT service 120 (which may then be decrypted by the security logic 613 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 7:
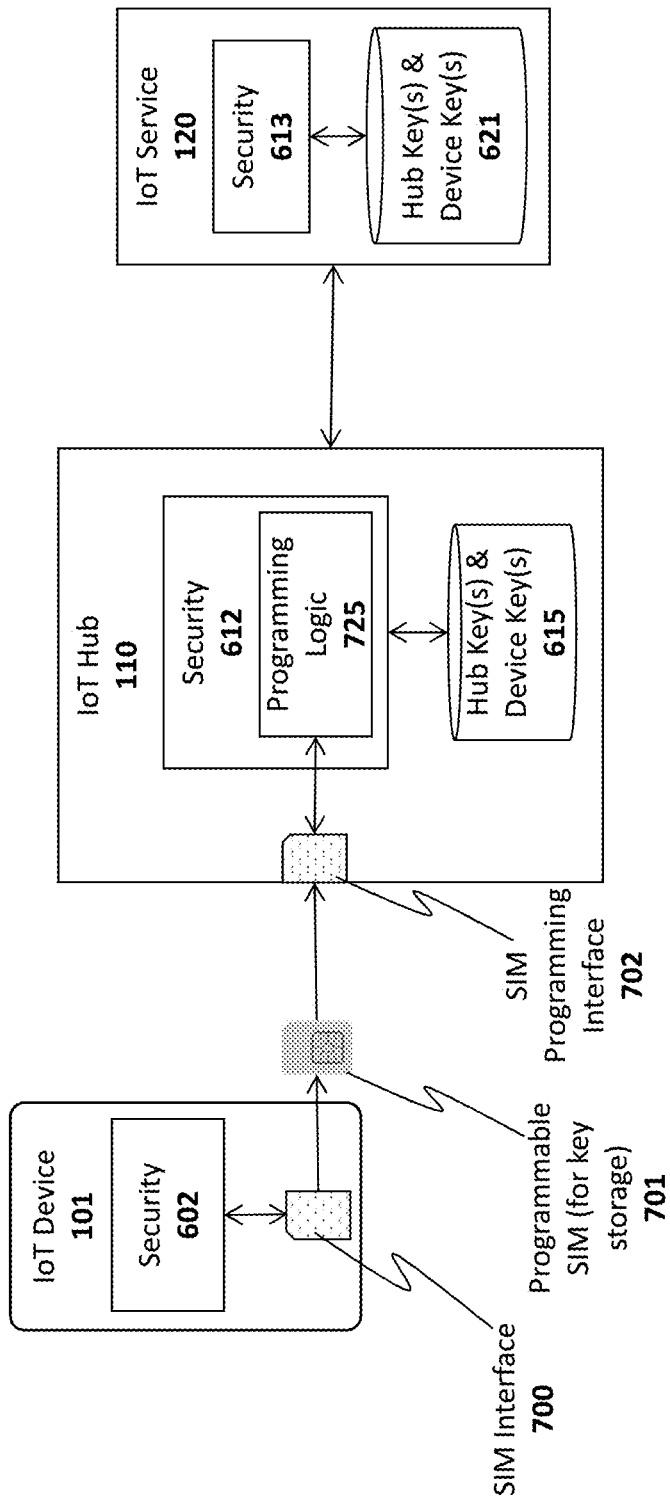
FIG. 7 illustrates one embodiment of an architecture in which a subscriber identity module (SIM) is used to store keys on IoT devices.

As illustrated in FIG. 7, in one embodiment, the secure key storage on each IoT device 101 is implemented using a programmable subscriber identity module (SIM) 701. In this embodiment, the IoT device 101 may initially be provided to the end user with an un-programmed SIM card 701 seated within a SIM interface 700 on the IoT device 101. In order to program the SIM with a set of one or more encryption keys, the user takes the programmable SIM card 701 out of the SIM interface 500 and inserts it into a SIM programming interface 702 on the IoT hub 110. Programming logic 725 on the IoT hub then securely programs the SIM card 701 to register/pair the IoT device 101 with the IoT hub 110 and IoT service 120. In one embodiment, a public/private key pair may be randomly generated by the programming logic 725 and the public key of the pair may then be stored in the IoT hub's secure storage device 411 while the private key may be stored within the programmable SIM 701. In addition, the programming logic 525 may store the public keys of the IoT hub 110, the IoT service 120, and/or any other IoT devices 101 on the SIM card 601 (to be used by the security logic 1302 on the IoT device 101 to encrypt outgoing data). Once the SIM 701 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 7 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 702 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoT service 120 and the new IoT device 101.

Figure 8A:
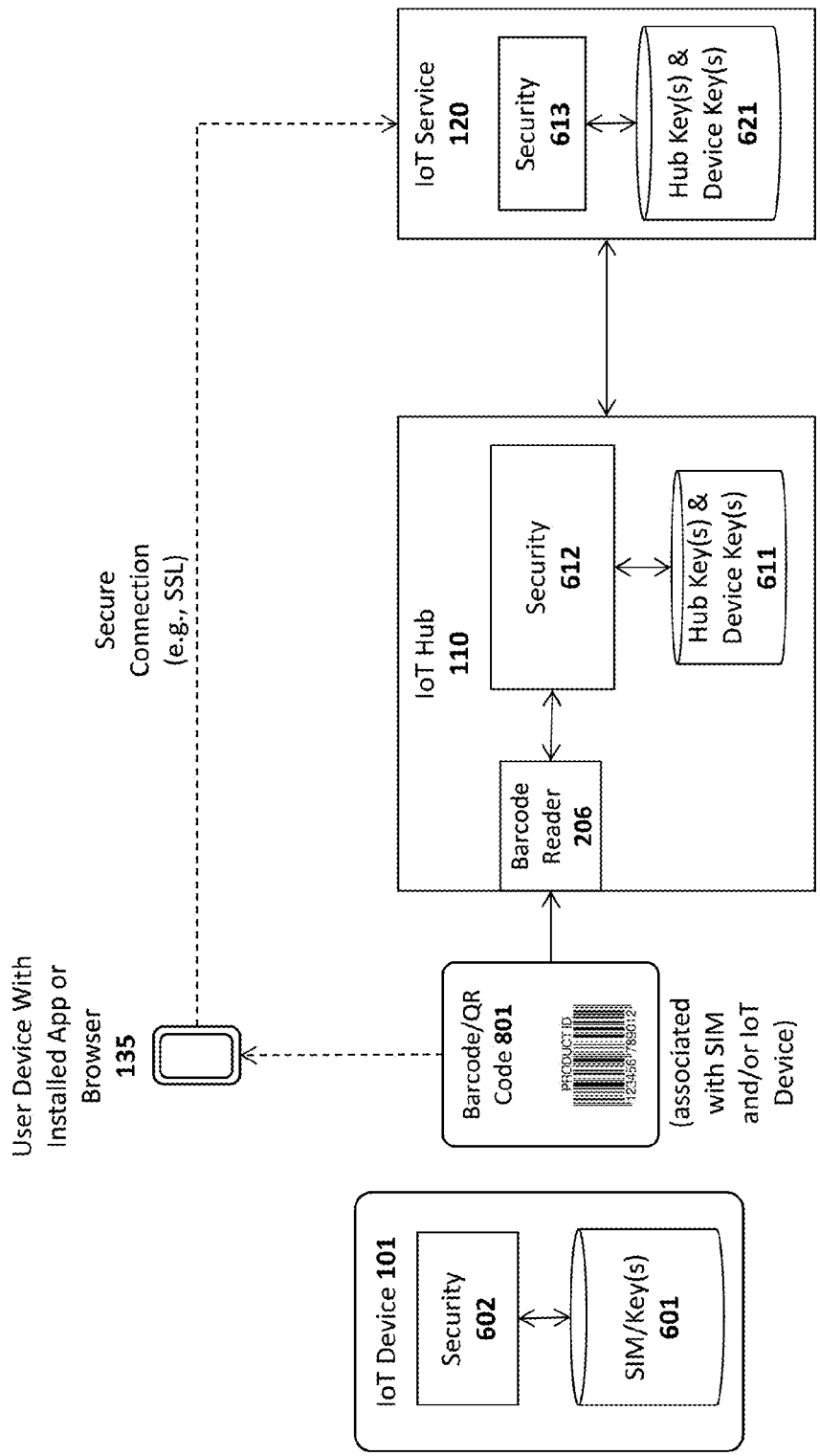
FIG. 8A illustrates one embodiment in which IoT devices are registered using barcodes or QR codes.

For example, as illustrated in FIG. 8A each IoT device 101 or SIM 401 may be packaged with a barcode or QR code 701 uniquely identifying the IoT device 101 and/or SIM 701. In one embodiment, the barcode or QR code 801 comprises an encoded representation of the public key for the IoT device 101 or SIM 1001. Alternatively, the barcode or QR code 801 may be used by the IoT hub 110 and/or IoT service 120 to identify or generate the public key (e.g., used as a pointer to the public key which is already stored in secure storage). The barcode or QR code 601 may be printed on a separate card (as shown in FIG. 8A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 801 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 701 may be used to pair each IoT device 101 with the IoT hub 110. For example, rather than using the standard wireless pairing process currently used to pair Bluetooth LE devices, a pairing code embedded within the barcode or QR code 701 may be provided to the IoT hub 110 to pair the IoT hub with the corresponding IoT device.

Figure 8B:
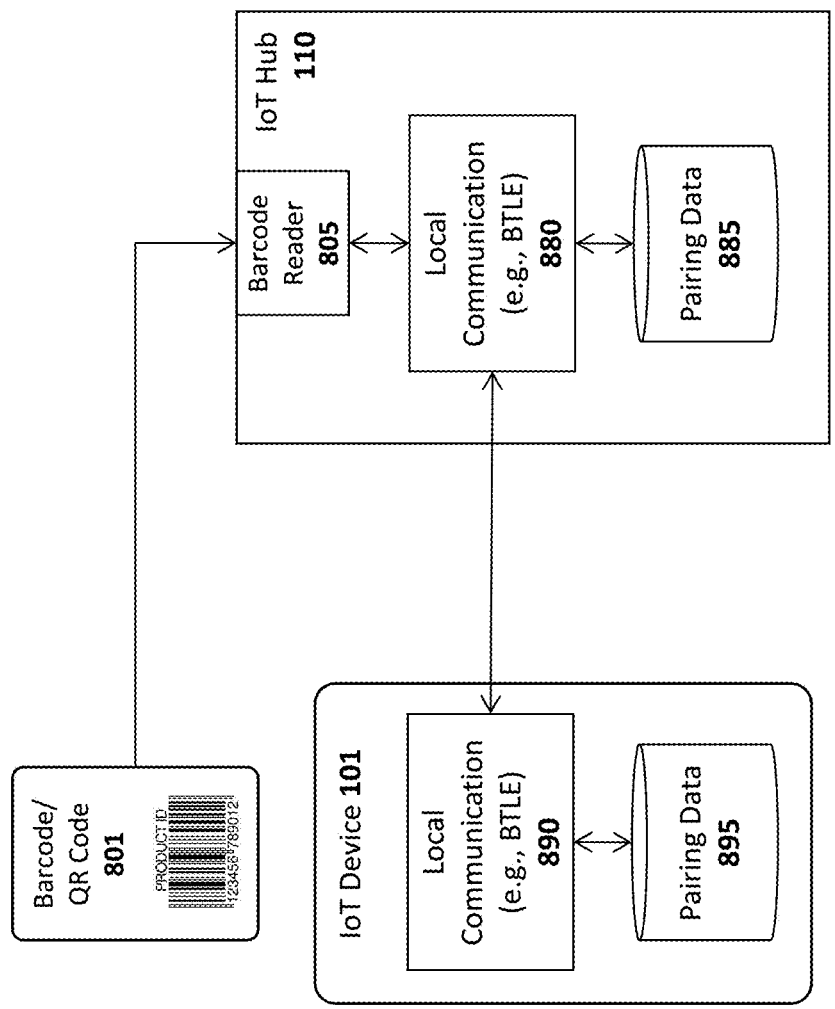
FIG. 8B illustrates one embodiment in which pairing is performed using barcodes or QR codes.

FIG. 8B illustrates one embodiment in which the barcode reader 206 on the IoT hub 110 captures the barcode/QR code 801 associated with the IoT device 101. As mentioned, the barcode/QR code 801 may be printed directly on the IoT device 101 or may be printed on a separate card provided with the IoT device 101. In either case, the barcode reader 206 reads the pairing code from the barcode/QR code 801 and provides the pairing code to the local communication module 880. In one embodiment, the local communication module 880 is a Bluetooth LE chip and associated software, although the underlying principles of the invention are not limited to any particular protocol standard. Once the pairing code is received, it is stored in a secure storage containing pairing data 885 and the IoT device 101 and IoT hub 110 are automatically paired. Each time the IoT hub is paired with a new IoT device in this manner, the pairing data for that pairing is stored within the secure storage 685. In one embodiment, once the local communication module 880 of the IoT hub 110 receives the pairing code, it may use the code as a key to encrypt communications over the local wireless channel with the IoT device 101.

Similarly, on the IoT device 101 side, the local communication module 890 stores pairing data within a local secure storage device 895 indicating the pairing with the IoT hub. The pairing data 895 may include the pre-programmed pairing code identified in the barcode/QR code 801. The pairing data 895 may also include pairing data received from the local communication module 880 on the IoT hub 110 required for establishing a secure local communication channel (e.g., an additional key to encrypt communication with the IoT hub 110).

Thus, the barcode/QR code 801 may be used to perform local pairing in a far more secure manner than current wireless pairing protocols because the pairing code is not transmitted over the air. In addition, in one embodiment, the same barcode/QR code 801 used for pairing may be used to identify encryption keys to build a secure connection from the IoT device 101 to the IoT hub 110 and from the IoT hub 110 to the IoT service 120.

Figure 9:
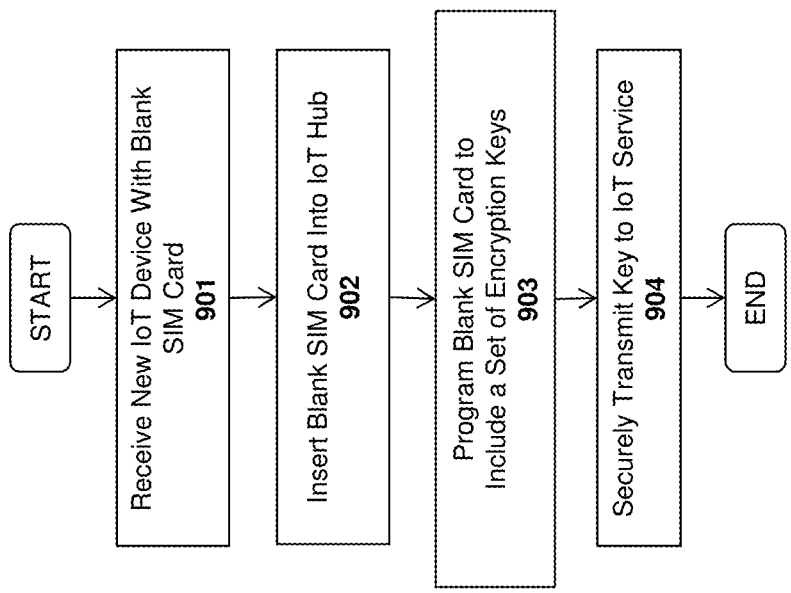
FIG. 9 illustrates one embodiment of a method for programming a SIM using an IoT hub.

A method for programming a SIM card in accordance with one embodiment of the invention is illustrated in FIG. 9. The method may be implemented within the system architecture described above, but is not limited to any particular system architecture.

At 901, a user receives a new IoT device with a blank SIM card and, at 802, the user inserts the blank SIM card into an IoT hub. At 903, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 904, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 9.

Figure 10:
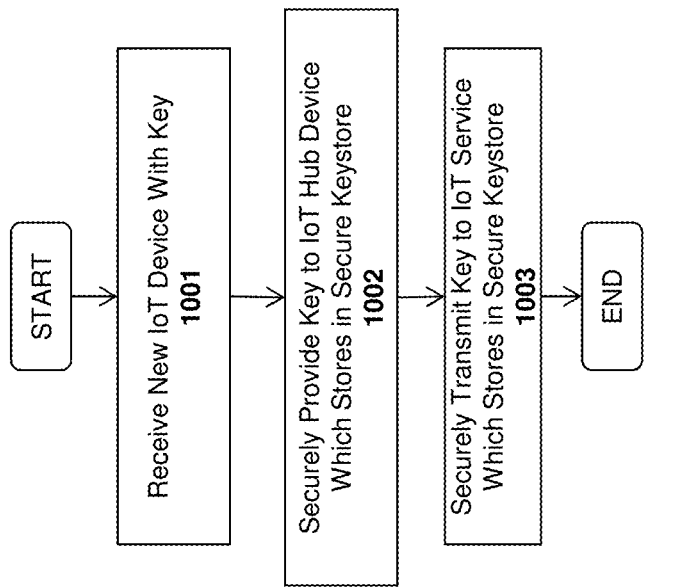
FIG. 10 illustrates one embodiment of a method for registering an IoT device with an IoT hub and IoT service.

A method for integrating a new IoT device into a network is illustrated in FIG. 10. The method may be implemented within the system architecture described above, but is not limited to any particular system architecture.

At 1001, a user receives a new IoT device to which an encryption key has been pre-assigned. At 1002, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or browser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 1003, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 11:
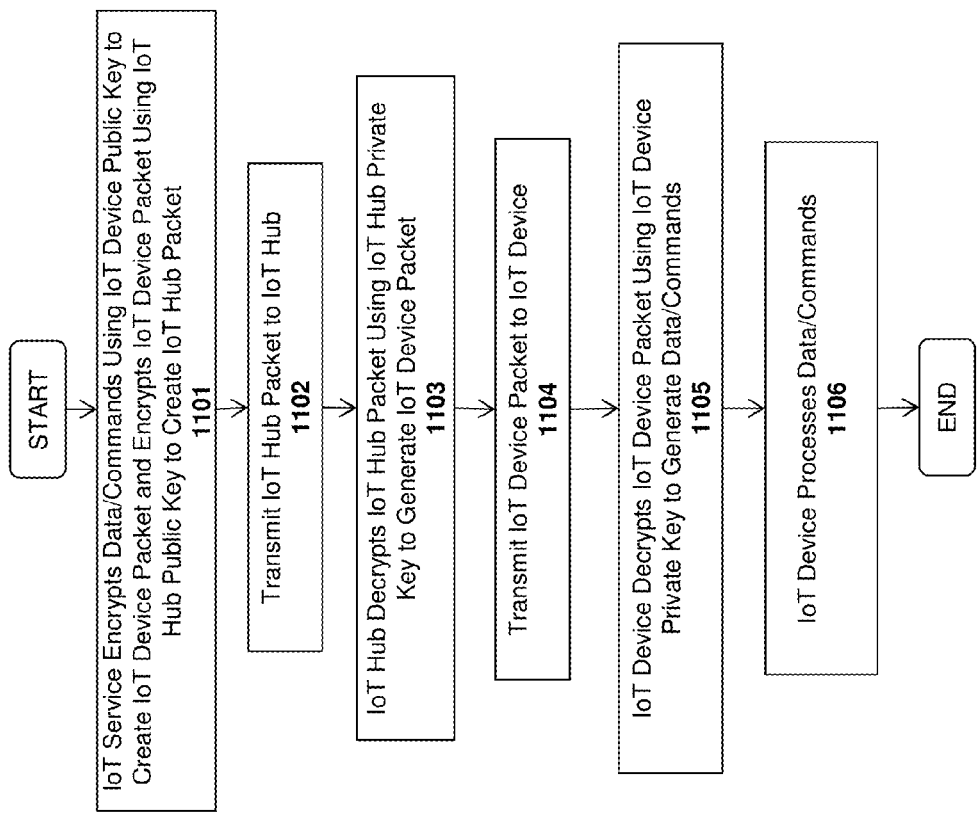
FIG. 11 illustrates one embodiment of a method for encrypting data to be transmitted to an IoT device.

A method for securely communicating commands/data to an IoT device using public/private keys is illustrated in FIG. 11. The method may be implemented within the system architecture described above, but is not limited to any particular system architecture.

At 1101, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1102, the IoT service transmits the IoT hub packet to the IoT hub. At 1103, the IoT hub decrypts the IoT hub packet using the IoT hub's private key to generate the IoT device packet. At 1104 it then transmits the IoT device packet to the IoT device which, at 1105, decrypts the IoT device packet using the IoT device private key to generate the data/commands. At 1106, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Internet of Things (IoT) Automotive Device, System, and Method

One embodiment of the invention comprises an Internet of Things (IoT) automotive device integrated within an IoT system to collect signal strength data from the user's mobile device and/or the IoT hub, analyze the signal strength data, and take specified actions (e.g., notifying the user of detected conditions). These embodiments of the invention may be configured to, for example, detect when a user has left a mobile device at home, and responsively notify the user and to safely detect when a car has been stolen.

Figure 12:
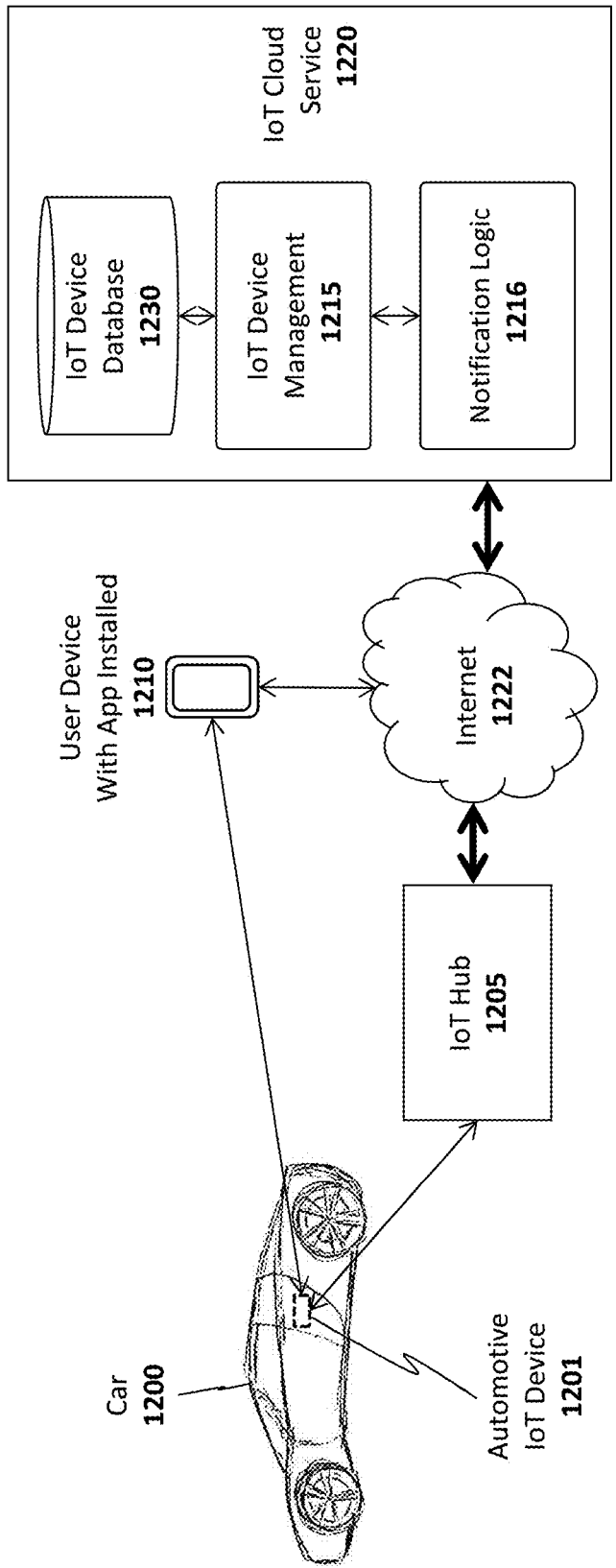
FIG. 12 illustrates a system architecture in accordance with one embodiment of the invention.

FIG. 12 illustrates one embodiment of a system architecture in which a car 1200 has been equipped with an automotive IoT device 1201 which is configured to connect to and/or take signal strength measurements between itself and the IoT Hub 1205 and the user's mobile device 1210. In one embodiment, the wireless connection between the automotive IoT device 1201 and the IoT hub 1205 and user device 1210 is a Bluetooth Low Energy (BTLE) connection and/or a WiFi connection. However, the underlying principles of the invention are not limited to any particular wireless protocols. Moreover, while not shown in FIG. 12, in one embodiment, the automotive IoT device 1201 may also include a cellular data radio for establishing a data connection with a cell service (e.g., a 4G LTE connection).

The interaction between the various system components shown in FIG. 12 may occur largely as described above. For example, the IoT hub 1205 communicatively couples its IoT devices (such as automotive IoT device 1201) to an IoT cloud service 1220 over the Internet 1222. The user may then access data and control the various IoT devices by connecting to the IoT cloud service 1220 via a user device 1210 with an IoT management app installed. In addition, the user may access and control the IoT devices via a browser or application installed on a desktop or laptop computer.

An IoT device database 1230 managed by the IoT cloud service 1220 includes database records for each of the IoT devices and IoT hubs configured in the system (which may include a plurality of IoT hubs and devices not shown in FIG. 12). IoT device management logic 1215 creates the database records for new IoT devices and updates the IoT device records in response to data transmitted by each of the IoT devices, including the automotive IoT device 1201. The IoT device management logic 1215 may also implement the various security/encryption functions described above to add new devices to the system (e.g., using QR codes/barcodes) and use keys to encrypt communications and/or generate digital signatures when communicating with the IoT devices such as automotive IoT device 1201.

In one embodiment, control signals transmitted from the app or application on the user device 1210 are passed to the IoT cloud service 1220 over the Internet 1222, then forwarded from the IoT cloud service 1220 to the IoT hub 1205 and from the IoT hub 1205 to one or more of the IoT devices, such as the automotive IoT device 1201. Of course, the underlying principles of the invention are not limited to any particular manner in which the user accesses/controls the various IoT devices.

Notification logic 1216 is included on the IoT cloud service 1220 to generate notifications to users and/or other cloud services in response to certain specified events (e.g., such as the user's car being stolen in one embodiment).

Figure 13A:
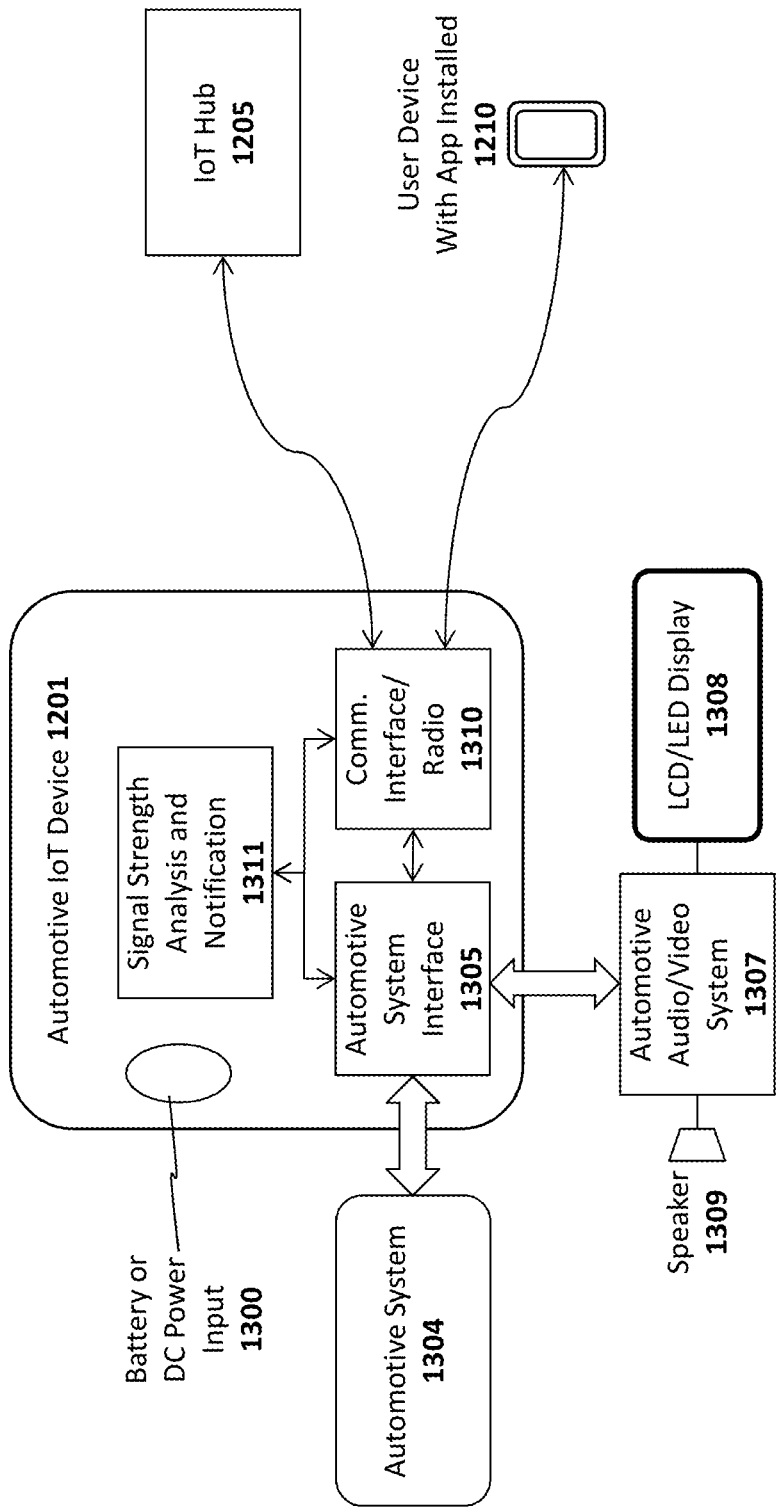
FIGS. 13A-B illustrate an automotive IoT device in accordance with embodiments of the invention.
Figure 13B:
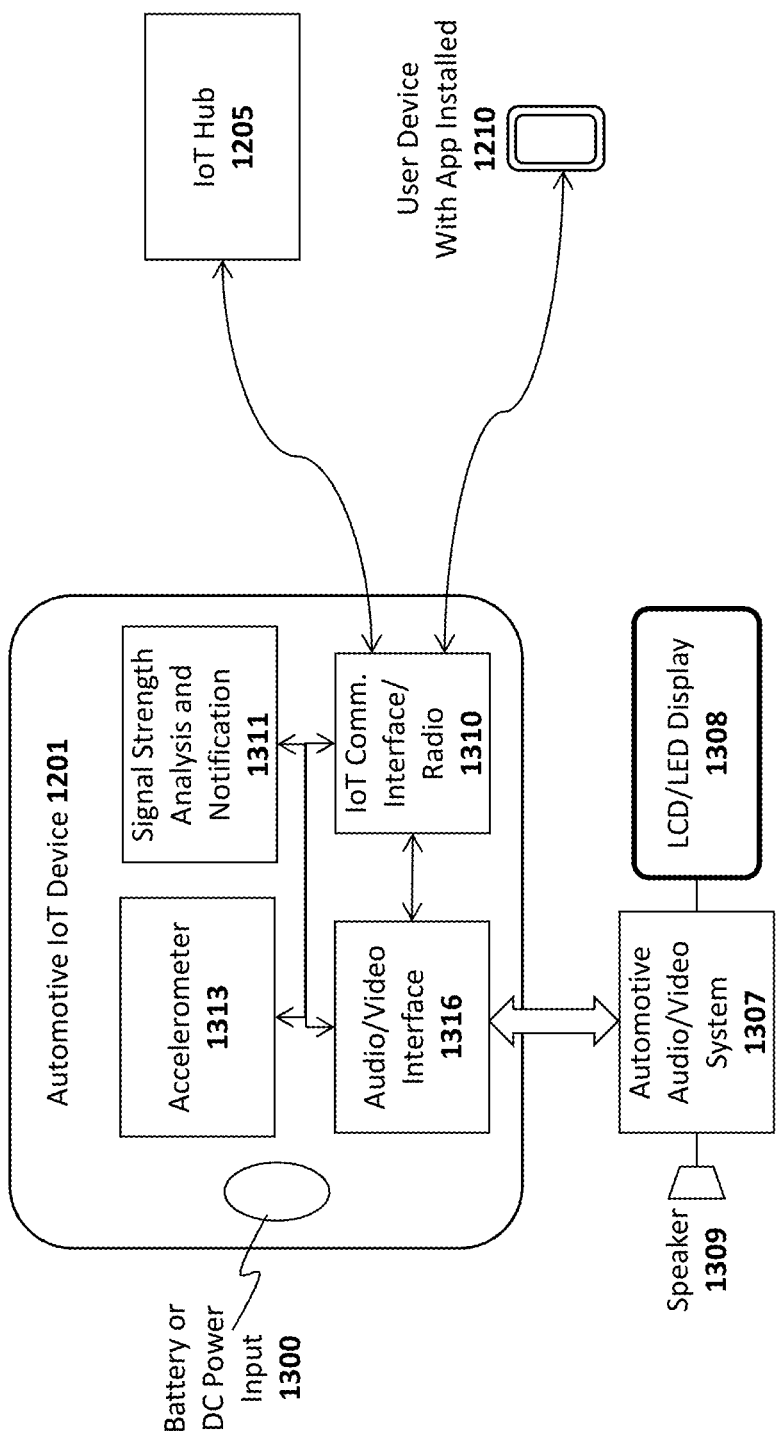

FIGS. 13A and 13B provide additional details of different embodiments of the automotive IoT device 1201. Turning first to FIG. 13A, one embodiment includes a communication interface/radio 1310 for establishing communication channels and/or collecting signal strength measurements (e.g., RSSI measurements) between the automotive IoT device 1201 and the IoT hub 1205 and/or the user device 1210. This embodiment also includes a signal strength analysis and notification module 1311 which analyzes and signal strength values, renders decisions based on the analysis, and generates notifications when appropriate. In addition, the illustrated embodiment includes an automotive system interface 1305 for establishing a connection with the car's audio/video system 1307 and/or collecting automotive data from the automotive system 1304 (e.g., such as whether the car is currently running, the current velocity, acceleration, etc). For example, many current automobiles include built-in data collection and management systems which continually monitor and collect data related to the use of the car. In one embodiment, the automotive system interface 1305 includes interface logic for connecting to these systems 1304 to determine the current velocity, acceleration, and/or other information related to the current state of the car. In some of the embodiments described above, the automotive IoT device 1201 may also transmit commands to the automotive system 1304 (e.g., to disable the car in the event the car is stolen).

FIG. 13B illustrates an alternate embodiment which includes a built in accelerometer 1313 (or other type of sensor) for detecting the current velocity and/or acceleration of the car. Consequently, this embodiment does not require interface logic to connect to the car's built in data collection system. However, this embodiment may still include an audio/video interface 1316 to couple the automotive IoT device 1201 to the car's audio/video system 1307 which may include a speaker 1309 for generating audible notifications and an LCD/LED display (or individual LEDs) for generating visible notifications in response to current detected conditions.

Regardless of how the automotive IoT device 1201 is configured within the car, in one embodiment, the signal strength analysis and notification module 1311 is configured to take signal strength measurements from the IoT hub 1205 (or other device known to be located at the user's home), and the user's mobile device 1210 to make decisions and generate notifications. For example, in one embodiment, the automotive IoT device 1201 will initially scan for both the user device 1210 and the IoT hub 1205 at the same time. If the signal strength (e.g., RSSI) for both the user device 1210 and the IoT hub 1205 can be measured, then the signals strength analysis and notification module 1311 will determine that the user is at home (and also that the car is close to the user's home). If the user device signal strength was detected, but no signal measured from the IoT hub 1205, then the signal strength analysis and notification module 1311 determines that the user is away from home.

In one embodiment, the various components 1310, 1311, 1313, 1316 of the automotive IoT device 1201 are put into a low power state when the car is idle. When the car is turned on and/or when an acceleration/velocity are detected from the accelerometer 1313 or automotive data 1304 provided via the interface 1305, the IoT communication interface/radio 1310 and signal strength analysis and notification module 1311 are powered on and begin taking signal strength measurements of the user device 1210 and IoT hub 1205. In one embodiment, the RSSI is measured over time. If the RSSI of the IoT hub 1205 is dropping during this time, the signal strength analysis and notification module 1311 may determine that the car is moving away from the user's home. If the RSSI of the user device 1210 is dropping, the signal strength analysis and notification module 1311 may determine that the car is moving away from the location of the phone/user. If the RSSI of the user device 1210 is constant or increasing during this time, the signal strength analysis and notification module 1311 may determine that the phone and user are inside the car.

Using this information, the signal strength analysis and notification module 1311 may generate notifications and/or alerts. For example, if the signal strength analysis and notification module 1311 detects that the car is moving away from the phone, this may mean that the user has forgotten his/her user device 1210. As such, in one embodiment, the signal strength analysis and notification module 1311 responsively communicates with the automotive audio/video system (e.g., via the system interface 1305 or A/V interface 1316) to generate an audible alert via the car speakers 1309 and/or generate a visual alert via the LCD/LED display 1308 (or other type of visual notification device such as a simple LED). If an LCD/LED display 1308 is available, specific details of the condition may be reported to the user such as text telling the user of the potential problem condition (e.g., "Did you remember your mobile device?" or, more generally, "Problem Condition 1").

Similarly, if the signal strength analysis and notification module 1311 detects that the car is driving away from the phone, this may also represent that the car is being car jacked. As such, in one embodiment, the user device 1210 may detect the change in RSSI and itself generate an alarm indicating the movement of the car. Alternatively, the signal strength analysis and notification module 1311 may transmit a notification to the phone which will then display the alarm condition. In either case, if the car is equipped with GPS or other location tracking capabilities, the signal strength analysis and notification module 1311 may collect the current location readings for the car and report them back to the user device 1210 and/or the IoT service 1220. As mentioned, the automotive IoT device 1201 (or the car itself) may include a cellular data connection. In such a case, the GPS data may be reported to the IoT service 1220 and/or the user device 1210 via this connection (i.e., if the car has moved out of range of both the user device 1210 and the IoT hub 1205).

In one embodiment, if the car has been stolen, the app on the user device 1210 will provide the user with an option to activate a special process which may be integrated within the signal strength analysis and notification module 1311 on the automotive IoT device 1201. In particular, once the user has indicated that the process should be initiated, in one embodiment, the car will function normally until the RSSI between the car and the user devices 1210 drops sufficiently low (or disappears completely) to represent the car is sufficiently far away from the user. In one embodiment, the automotive IoT device 1201 then transmits a "disable" signal via the automotive system interface 1305 to shut down the car and/or sound the car alarm. In this manner, the user will be provided with a sufficient amount of time to get away from the carjacker and the car will be rendered safe and non-functional.

In one embodiment, if the signal strength analysis and notification module 1311 detects that the user device 1210 is moving closer to the car, this may represent that the user is walking toward the car. In one embodiment, the presence of the user device 1210 may be sufficient for the signal strength analysis and notification module 1311 to unlock the car doors and/or disable car security via the automotive system 1304. In another embodiment, the app on the user device 1210 may request user authentication (e.g., a user ID or biometric reading such as a fingerprint) to unlock the car doors.

Figure 14:
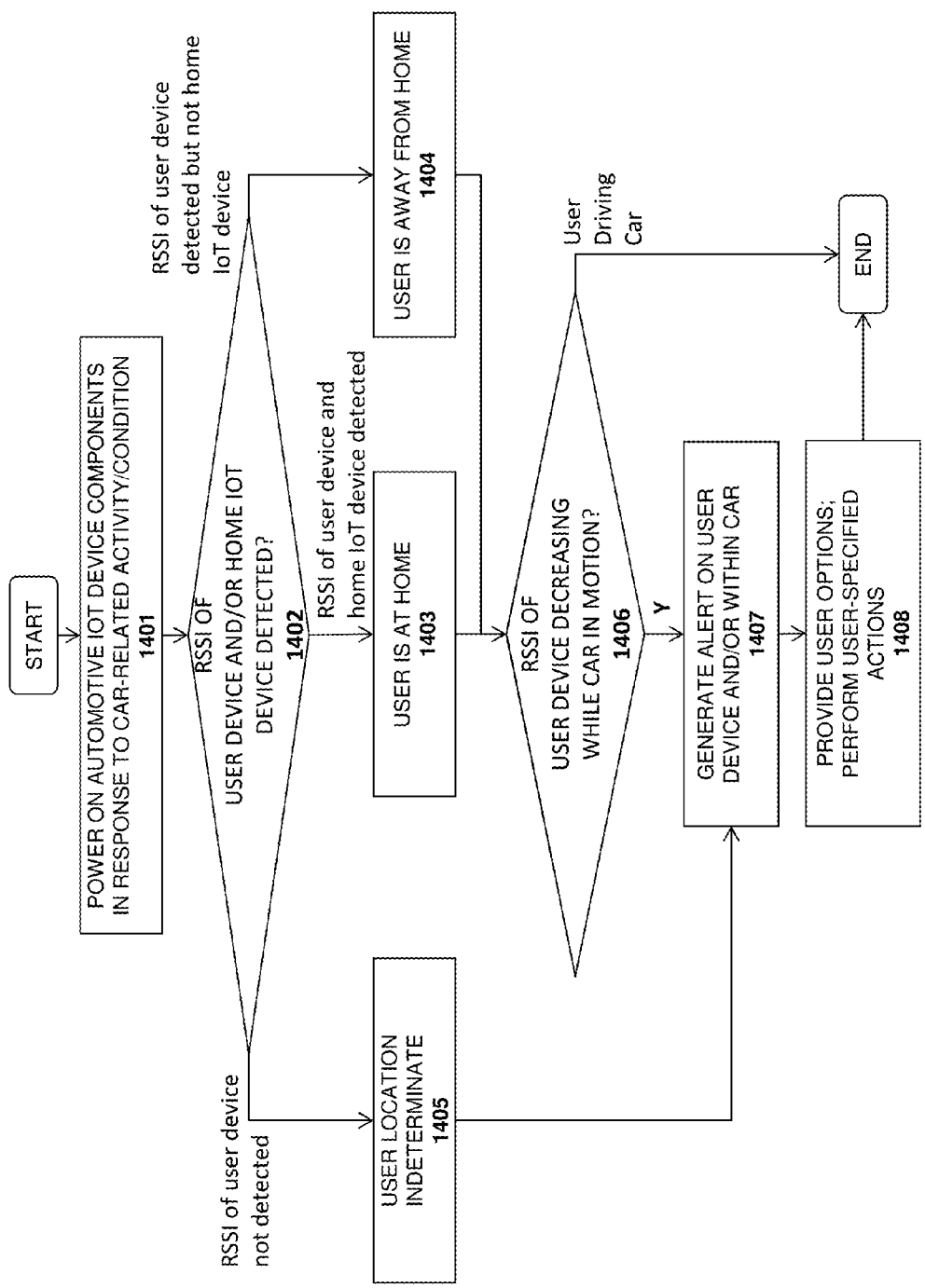
FIG. 14 illustrates a method in accordance with one embodiment of the invention.

A method in accordance with one embodiment of the invention is illustrated in FIG. 14. The method may be implemented within the context of the system and device architectures described above (e.g., by the signal strength analysis and notification module 1311) but is not limited to any particular system or device architecture.

At 1401, the components of the automotive IoT device are powered on or awakened from a sleep state in response to car-related activity or conditions. This may include, for example, the car being started and/or the automotive IoT device detecting the car moving (e.g., detected via an accelerometer or by reading data from the automotive interface as described above). At 1402, a determination is made as to whether the RSSI of the user device and/or a home IoT device (such as the IoT hub) is detected. If the RSSI of the user device and the home IoT device is detected, then a determination is made that the user and car are at the user's home at 1403. If the RSSI of the user device is detected but the RSSI of the home IoT device is not detected, then the user is determined to be with the car but away from home at 1404. In either of these cases, at 1406, a determination is made as to whether the RSSI of the user device is decreasing while the car is in motion. If so, then this could mean that the user has forgotten his/her device at home or another location or it could mean that the car is being stolen. As such, at 1407, an alert may be generated on the user device and/or within the dashboard display of the car. As mentioned above, the user may be provided with options on the user device to, for example, disable the car. At 1408, upon receiving the user's selections, one or more specified user actions may be performed (e.g., disabling the car when it is sufficiently far away from the mobile device).

If the RSSI of the user device is not detected at 1402, then the user's location is indeterminate at 1405. Because the car is being moved without the user, an alert may be generated on the user device and/or within the car at 1407. At 1408, the user may be provided with options as described above (e.g., to disable the car).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An automotive Internet of Things (IoT) device to be configured within a car comprising:
   a wireless communication interface to take signal strength measurements to a mobile device, the signal strength measurements comprising signal strength values; and
   a signal strength analysis and notification module to analyze the signal strength values from the mobile device to determine when the car is being operated without the mobile device present and to responsively generate a notification to the user;
   wherein the notification is transmitted to an app or browser installed on the user's mobile device, wherein the app or browser responsively generates an audible and/or visual notification; and wherein the app or browser provides one or more graphical user interface (GUI) elements to allow the user to disable the car in the event that the car has been stolen; and an automotive system interface to communicatively couple the IoT device to an automotive control system in the car, wherein upon the user selecting a GUI element to disable the car, the mobile device transmits a disable command to the IoT device, which provides the disable command or a translated version of the disable command to the automotive control system to disable the car.

2. The IoT device as in claim 1 further comprising:
an interface communicatively coupling the signal strength analysis and notification module to an audio and/or video (A/V) system of the car, the signal strength analysis and notification module to transmit the notification to the interface to generate an audible notification and/or a visual notification on a dashboard of the car.

3. The IoT device as in claim 2 wherein the visual notification comprises text displayed on the dashboard notifying the user that the mobile device is not with the user.

4. The IoT device as in claim 1 wherein the signal strength and analysis module continues to measure signal strength to the user device and only transmits the disable command to the automotive control system when the signal strength has reached a specified low threshold value.

5. The IoT device as in claim 4 wherein the specified low threshold value comprises no signal detected from the mobile device.

6. The IoT device as in claim 1 wherein the signal strength values comprise received signal strength indicator (RSSI) values.

7. The IoT device as in claim 1 wherein the wireless communication interface comprises a Bluetooth Low Energy (BTLE) interface, a WiFi interface and/or a cellular data interface.

8. The IoT device as in claim 1 wherein the signal strength analysis and notification module is further configured to measure signal strength from one or more IoT devices configured in a the user's home and to analyze the signal strength values to determine whether the user is at home or away from home.

9. A method comprising:
measuring signal strength from a mobile device to determine signal strength values;
analyzing the signal strength values from the mobile device to determine when the user has left his or her mobile device at home or at another location; and
responsively generating a notification to the user when it is determined that the user has left his or her mobile device at home;
wherein the notification is transmitted to an app or browser installed on the user's mobile device, wherein the app or browser responsively generates an audible and/or visual notification;
wherein the app or browser provides one or more graphical user interface (GUI) elements to allow the user to disable the car in the event that the car has been stolen;
wherein upon the user selecting a GUI element to disable the car, transmitting a disable command or a translated version of the disable command to an automotive control system to disable the car; and
continuing to measure signal strength to the user device and only transmitting the disable command to the automotive control system when the signal strength has reached a specified low threshold value.

10. The method as in claim 9 further comprising:
transmitting the notification to an interface communicatively coupled to an audio and/or video (A/V) system of the car to generate an audible notification and/or a visual notification on a dashboard of the car.

11. The method as in claim 10 wherein the visual notification comprises text displayed on the dashboard notifying the user that the mobile device is not with the user.

12. The method as in claim 9 wherein the specified low threshold value comprises no signal detected from the mobile device.

13. The method as in claim 9 wherein the signal strength values comprise received signal strength indicator (RSSI) values.

14. The method as in claim 9 wherein the wireless communication interface comprises a Bluetooth Low Energy (BTLE) interface, a WiFi interface and/or a cellular data interface.

15. The method as in claim 9 further comprising:
measuring signal strength from one or more IoT devices configured in a the user's home and analyzing the signal strength values to determine whether the user is at home or away from home.

16. An automotive Internet of Things (IoT) device to be configured within a car comprising:
a wireless communication interface to take signal strength measurements to a mobile device, the signal strength measurements comprising signal strength values;
a signal strength analysis and notification module to analyze the signal strength values from the mobile device to determine when the user has left his or her mobile device at home or at another location and to responsively generate a notification to the user; and
wherein the signal strength analysis and notification module is further configured to measure signal strength from one or more IoT devices configured in a the user's home and to analyze the signal strength values to determine whether the user is at home or away from home.

17. The IoT device as in claim 16 further comprising:
an interface communicatively coupling the signal strength analysis and notification module to an audio and/or video (A/V) system of the car, the signal strength analysis and notification module to transmit the notification to the interface to generate an audible notification and/or a visual notification on a dashboard of the car.

18. The IoT device as in claim 17 wherein the visual notification comprises text displayed on the dashboard notifying the user that the mobile device is not with the user.

19. The IoT device as in claim 16 wherein the notification is transmitted to an app or browser installed on the user's mobile device, wherein the app or browser responsively generates an audible and/or visual notification.

20. The IoT device as in claim 19 wherein the app or browser provides one or more graphical user interface (GUI) elements to allow the user to disable the car in the event that the car has been stolen.

21. The IoT device as in claim 20 further comprising an automotive system interface to communicatively couple the IoT device to an automotive control system in the car, wherein upon the user selecting a GUI element to disable the car, the mobile device transmits a disable command to the IoT device, which provides the disable command or a translated version of the disable command to the automotive control system to disable the car.

22. The IoT device as in claim 21 wherein the signal strength and analysis module continues to measure signal strength to the user device and only transmits the disable command to the automotive control system when the signal strength has reached a specified low threshold value.

23. The IoT device as in claim 22 wherein the specified low threshold value comprises no signal detected from the mobile device.

24. The IoT device as in claim 16 wherein the signal strength values comprise received signal strength indicator (RSSI) values.

25. The IoT device as in claim 16 wherein the wireless communication interface comprises a Bluetooth Low Energy (BTLE) interface, a WiFi interface and/or a cellular data interface.

* * * * *